United States Patent [19]
Ryham

[11] Patent Number: 5,259,928
[45] Date of Patent: Nov. 9, 1993

[54] APPARATUS FOR EVAPORATION OF LIQUID SOLUTIONS

[75] Inventor: Rolf Ryham, Suwanee

[73] Assignee: A. Ahlstrom Corporation, Noormarkku, Finland

[21] Appl. No.: 699,768

[22] Filed: May 14, 1991

[51] Int. Cl.5 .............................................. B01D 1/22
[52] U.S. Cl. .................................. 159/13.1; 159/28.6; 159/49; 159/DIG. 15; 202/197
[58] Field of Search ............... 159/13.1, 28.6, DIG. 2, 159/49, DIG. 15; 202/236, 197

[56] References Cited

U.S. PATENT DOCUMENTS

| | | | |
|---|---|---|---|
| 3,219,555 | 11/1965 | Poindexter et al. | 202/197 |
| 3,371,709 | 3/1968 | Rosenblad | 159/28.6 |
| 3,458,404 | 7/1969 | Vincent et al. | 202/197 |
| 3,808,104 | 4/1974 | Davidson | 159/28.6 |
| 4,636,283 | 1/1987 | Nasser | 159/28.6 |
| 4,978,429 | 12/1990 | Sears et al. | 159/28.6 |

Primary Examiner—Wilbur Bascomb, Jr.
Attorney, Agent, or Firm—Cohen, Pontani, Lieberman, Pavane

[57] ABSTRACT

Apparatus and method for evaporating a liquid includes a casing; a plurality of vertically extending plate-type heating elements within the casing, each heat element having an outer surface and an inner surface and a vertical edge, the heat elements being spaced and forming an open channel along the vertical edge between adjacent elements; a distributor above the heating elements for distributing the liquid over the elements; an inlet connected to the heating elements for introducing a heating medium and for generating vapor from the liquid; and a wall-like device mounted within the casing facing the spaces between the heating elements for collecting and guiding the vapor generated in the evaporator. Preferably, the wall-like element includes a droplet separating device formed by vertically elongated spaced elements having a substantially U-shaped cross-section with inwardly pointing vertical edges.

6 Claims, 3 Drawing Sheets

APPARATUS FOR EVAPORATION OF LIQUID SOLUTIONS

FIELD OF THE INVENTION

The present invention relates to falling film type evaporators and especially to a following film type evaporator provided with means for collecting and guiding vapor generated in an evaporator and for separating droplets entrained in the vapor.

BACKGROUND OF THE INVENTION

Falling film evaporators and especially evaporators of the plate type or free flow falling film type have proven its superiority in performance and energy consumption over other types of evaporators, such as, for example, Kestner LTV type evaporators, forced circulation type evaporators and tubular falling film evaporators. The advantage of the free flow falling film type evaporator over other types of evaporators, for instance, tubular type evaporators using the inner surfaces of a plurality of tubes for evaporation are many. For example, in the plate type falling film evaporators the evaporation surface is exposed to the surrounding vapor space along most or all of the vertical surface thus leaving a large free area between the heating elements for release of the vapor generated thereon. The equivalent vapor release area in a tubular type evaporator would be the horizontal cross-sectional area of a vertical tube. This means that in the tubular type evaporator a suspension of liquid and vapor exits from the tube at relatively high velocity and which suspension must be separated in the same manner as in a Kestner type evaporator utilizing a large receiving space located below the tube bundle. In the free flow falling film type evaporator the vapor simply escapes from between the plate elements and flows freely into the space defined by the circular vessel surrounding or housing the square or rectangular heating element package. The vapor generated will travel in a curved pattern, i.e. initially in a slightly downward direction between the plate elements due to the inertia of the liquid flow and when approaching the edge the vapor will travel in a slightly upward direction and thereafter in a substantially vertical upward movement when flowing out into the free space between the element package and the vessel wall. The vapor raises and accelerates on its way up and reaches its maximum velocity when passing over the upper edge in the upper part of the heating elements. During this upward movement, the vapor can carry along and entrain some of the liquid which has just been deposited on the heating elements. Normally, the vapor is thereafter collected in a chevron type droplet separator and thus permitted to flow out through the top of the vessel. Such apparatus are, for example, used to a considerable extent in the pulp industry.

For reasons of economy, for example, in the recovery of chemicals, and for reasons of environmental preservation, care must be taken that the droplets of liquid are not carried along by the vapor to outside of the evaporator which has been a problem with the known evaporation systems.

SUMMARY OF THE INVENTION

In accordance with the present invention these and other problems are solved by changing the prior art unfavorable flow pattern of the vapor generated in the evaporator. Thus, most of the vertically raising vapor exiting in substantially horizontal direction from the space between the plates is collected by a vapor collecting means having openings therein and being located adjacent the free spaces between the heating elements of the evaporator as further described below.

The method of evaporating a liquid in accordance with the present invention comprises introducing the liquid into a space defined by a casing having a plurality of spaced apart heating elements therein, each said heating elements having an outer and inner surface; evaporating said liquid by feeding said liquid to said heating elements and causing said liquid to flow as a thin-film over the outer surfaces of said heating elements and by feeding a heating medium to said inner surfaces so as to generate vapor; mounting means in said casing facing said spaces between said heating elements for collecting said vapor; permitting said vapor to exit from said heating elements and to enter said vapor collecting means; collecting part of said vapor in said vapor collecting means; and permitting the remainder of said vapor to pass into a vapor receiving space between said vapor collecting means and said casing. The apparatus includes a casing; a plurality of vertically extending plate-like heating elements within said casing, each said heating element having an outer surface and an inner surface and a vertical edge, said heating elements being spaced and forming an open channel along said vertical edge between adjacent elements; means above said heating elements for distributing said liquid over said elements; means connected to said heating elements for introducing a heating medium therein for contacting said inner surface and for generating vapor from said liquid and means mounted within said casing facing said spaces between said heating elements for collecting and guiding said vapor.

According to one embodiment of the present invention the vapor due to its substantially straight horizontal movement causes little, if any, disturbance of the down falling liquid film. As the vapor is collected upon exiting from the vapor space between respective opposite plates along substantially the entire lateral edges of the heating elements, the prior art phenomenon of liquid being carried along by the accelerating vapor will not occur.

The collection device includes one or more plates representing one or more vertical wall or walls running perpendicular to the lateral edges of the heating elements so as to essentially close off the spaces therebetween. These walls may be positioned at one or both sides of the heating elements and are connected to direct the vapor flow into the vapor collection point or outlet. The walls are also provided with a plurality of vertical openings through which the vapor passes.

Thus the vapor exiting from either one or both sides of the heating elements is guided in an arrangement of internal vapor ducting and guided into one single outlet as further described below. The internal vapor ducting can be arranged in such a way that the empty space, i.e. the dome, of the evaporator is used for collecting the vapor, from where it is then guided to the vapor outlet and exhausted therefrom. By this arrangement the vapor body, that is the free vapor space between the evaporator casing and the heating elements, can be more effectively utilized and consequently be made smaller for a specific duty evaporator than heretofore possible.

The internal vapor ducting according to the present invention also permits greater freedom in locating the external vapor conduits. For example, the vapor outlet as well as the inlet for heating steam can be located in the lower part of the evaporator. In multiple effect evaporating systems the vapor generated in one effect is usually utilized as a heating medium in the next effect. Accordingly, with the present invention, connecting pipes between evaporators in a multiple effect evaporating system can be made shorter than if the vapor were discharged through the top of the evaporator and the discharged vapor fed into the bottom of the next following evaporator.

The vertical openings in the vapor collecting walls are preferably provided with a droplet separation device which operates according to the inertia principle and wherein the liquid droplets entrained in the vapor are separated. The separated droplets are then discharged into a liquid pool below the heating elements. Depending on the application, the inertia type separator can be of the chevron or labyrinth type and be designed for mounting to the vertical wall or as an integral part of the vertical wall or walls.

According to a preferred embodiment of the present invention the wall or droplet separation device comprises a plurality of elongated spaced apart trough-like elements having a substantially U-shaped cross-section. These trough-like elements extend substantially vertically and substantially parallel to the elongated vertical edges of the heating elements and are arranged typically in two rows, off-set to one another, so that the U-shaped elements of one row are located in front of the space between the U-shaped elements of the other row and vice versa. The liquid/vapor mixture exiting from the evaporator plates impinges during its horizontal movement on the inner surfaces of the trough or U-shaped element causing the liquid to be separated and flow downwards, while the vapor continues to flow through the spaces between the troughs.

The droplet separator can also be formed by constructing the vertical walls from a thin woven steel strip or fabric suspended on a simple framework. This woven steel fabric can be arranged in such a manner that it either acts as a mesh pad or as an inertia device in known manner.

BRIEF DESCRIPTION OF THE DRAWINGS

These and other advantages of the present invention will be more fully understood from the following detailed description of a preferred embodiment of the invention, especially when read in conjunction with the accompanying drawings, in which.

DETAILED DESCRIPTION OF THE PRESENTLY PREFERRED EMBODIMENTS

Figure 1:
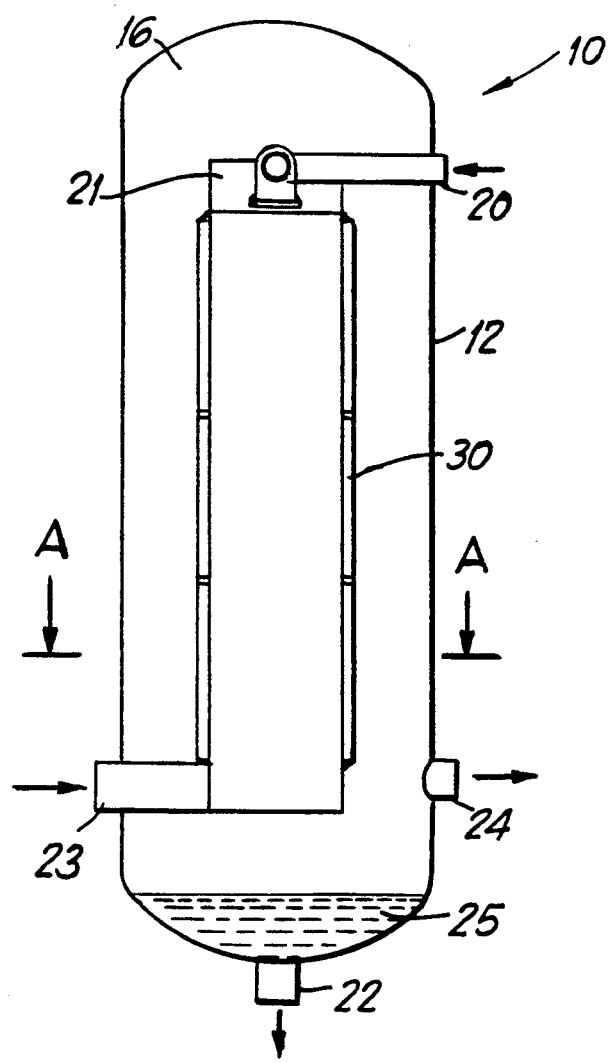
FIG. 1 shows a side cut away view of an evaporator system according to the present invention.
Figure 2:
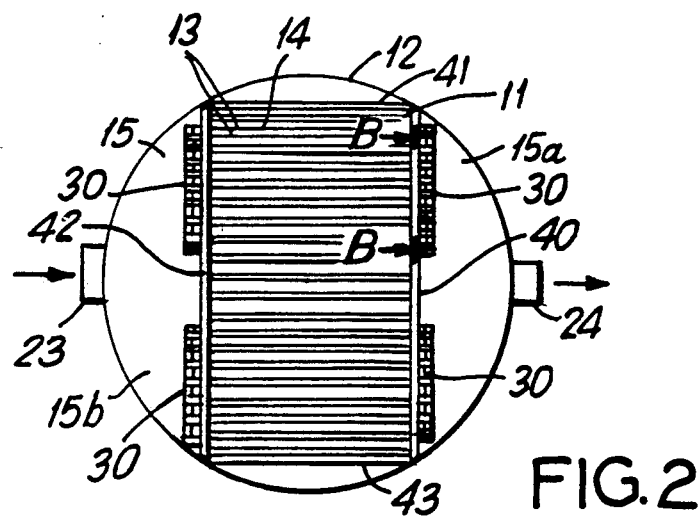
FIG. 2 is a sectional view along the line A—A of FIG. 1.

FIGS. 1 and 2 show an evaporation system according to the present invention. The evaporator 10 includes a plurality of vertically disposed spaced, plate type heating elements 11 in a casing 12. Opposite surfaces of adjacent heating elements define elongated vertical channels 14 between the elements. The heating elements 11 preferably consist of opposing pairs of plates 13 joined at their peripheries. The liquid to be evaporated e.g. liquor from a pulping operation, flows downward over the outer surfaces of the heating elements 11 in the form of a thin film which is heated by steam introduced into the inside of the elements.

Above the elements 11 is located a liquid distribution tray 21 having generally a horizontal bottom and upright side walls. The bottom of the tray is provided with holes allowing the liquid to pass from the tray 21 onto the surfaces of the plate elements 11 beneath the tray 21. The liquid to be evaporated, for instance black liquor, is fed to the tray 21 through a line 20. The liquid flowing downward is heated to the boiling point by steam, which is fed through a line 23 into the heating element 11 and flows within the elements 11 countercurrently to the liquid on the outside thereof. The concentrated liquid is collected in pool 25 in the bottom of the evaporator and is withdrawn therefrom through a line 22.

Vapor which has been evaporated from the liquid exits from both vertical sides of the channels 14 along the height or length thereof. Vertical walls 40-43 are positioned close to the heating elements 11 and form a closed, vapor collecting system which directs the flow of the vapor.

Figure 3:
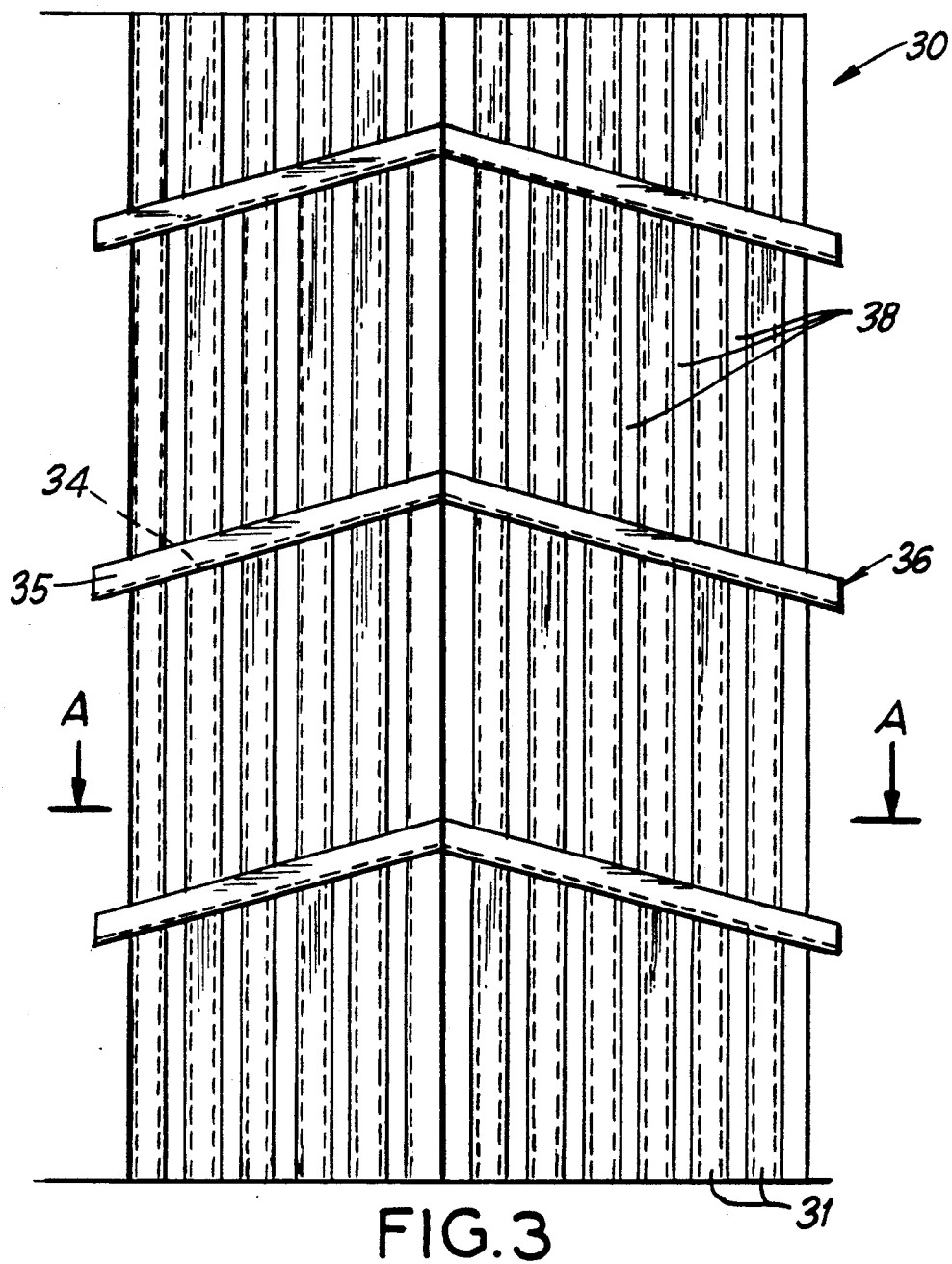
FIG. 3 is a sectional view taken along the line B—B of FIG. 2 illustrating a part of a droplet separation construction in accordance with the present invention.
Figure 4:
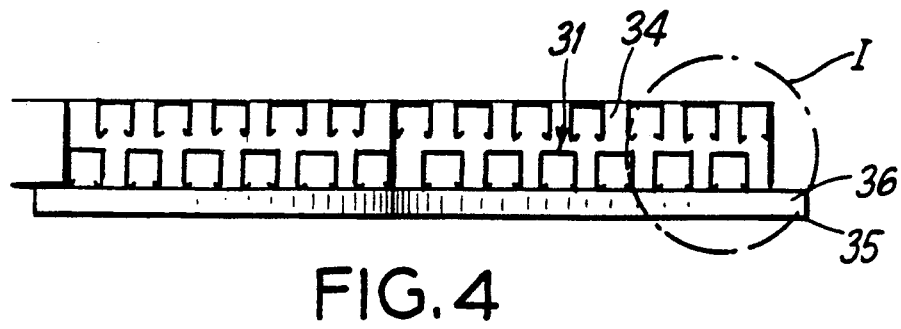
FIG. 4 is a sectional view along the line A—A of FIG. 3.
Figure 5:
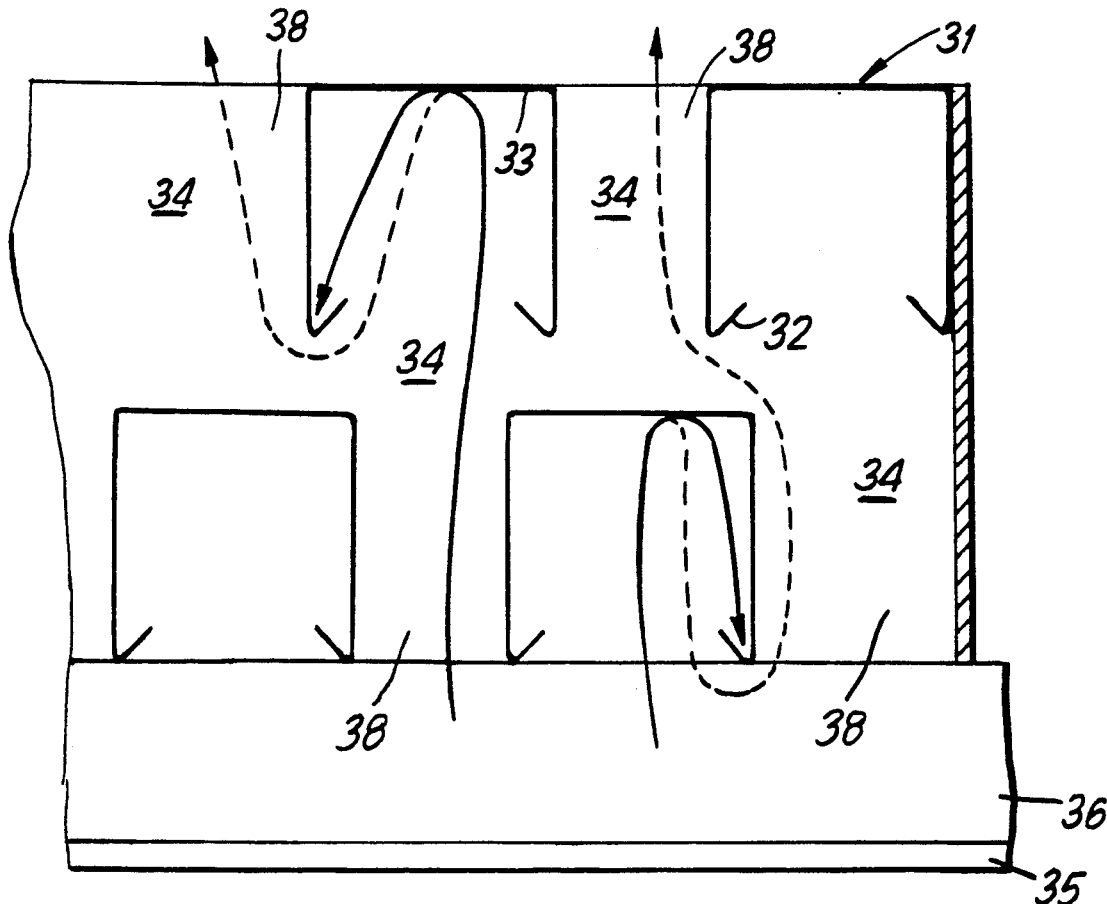
FIG. 5 is an enlarged fractional view of detail I of FIG. 4.
Figure 7:
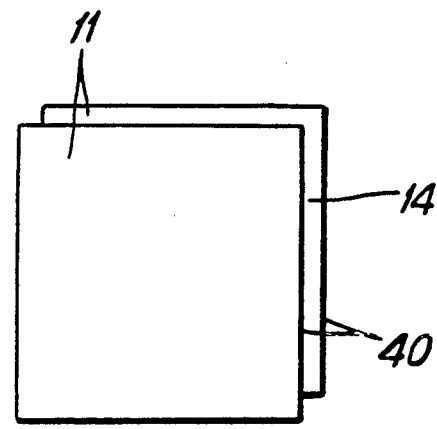
FIG. 7 is a side-perspective view of the vertical edges of the heating elements.

The vapor/liquid mixture exiting from both sides of the channels 14 during its substantially horizontal movement will contact the vertical walls 40,42 located adjacent the lateral edges of the heating elements. As shown in FIG. 7 these walls are provided with vertical openings and a droplet separating system as will be described in more detail in the following. A preferred embodiment of the droplet separation system is illustrated in FIGS. 3-5. This droplet separator 30 comprises spaced, vertically elongated, trough-shaped elements 31, which are typically arranged into two rows with their respective openings facing the heating elements. Elements 31 extend substantially vertically and parallel to the vertical edges of the heating elements 11. They can extend up to the uppermost part of the heating elements or the upper part of the vertical wall may be closed off entirely. Each element 31 has a substantially U-shaped cross-section whereby the free ends 32 of the sides preferably point inwards. The elements 31 forming the droplet separator 30 are supported by bottom plates 34 extending transverse to the longitudinal U-shaped elements 31. Each plate 34 has an upstanding end wall 35 facing heating elements 11 and forming a channel 36. The vapor/liquid mixture exiting from the evaporator contacts the inner surface 33 of elements 31, causing the liquid to be separated from the vapor. The liquid will flow downward and is collected by the bottom plates 34 and directed via channel 36 to liquid pool 25.

The vapor flows through the slot shaped vertical openings 38 between the troughs 31 into vapor spaces 15 between the vertical walls formed by droplet separator 30 and the evaporator casing 12. The vapor outlet 24 is preferably located in the lower part of the other vapor space 15a. Thus, the vapor from the vapor space 15b is first collected in a vapor dome 16, and is then discharged together with the vapor from the vapor space 15a through the outlet 24.

Figure 6:
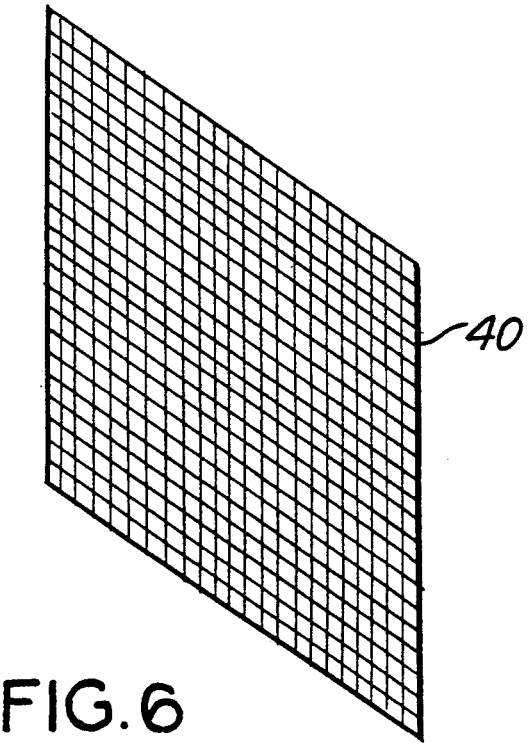
FIG. 6 is a perspective view of the droplet separating means in accordance with the present invention.

Alternatively, as shown in FIG. 6, the droplet separator can also be formed by constructing the vertical walls from a thin woven steel strip or fabric suspended on a simple framework. It should be understood that the preferred embodiments described are for illustrative purposes only and are not to be construed as limiting the scope of the present invention which are properly delineated only in the appended claims.

What is claimed is:

1. An apparatus for evaporating a liquid comprising:
   a casing;
   a plurality of vertically extending flat, planar plate-shaped heating elements within said casing, each of said heating elements having an outer surface and an inner surface and a vertical edge, said heating elements being disposed in adjacent, substantially parallel relation and defining a space therebetween, said heating elements forming an open channel along and between said vertical edges;
   means, disposed above said heating elements, for distributing said liquid over said heating elements;
   means, connected to said heating elements, for introducing a heating medium therein for contacting said inner surface and for heating said heating elements so as to generate vapor from said liquid;
   said casing comprising a vapor outlet; and
   means for collecting and guiding said vapor to said vapor outlet, said vapor collecting and guiding means comprising at least one vertically disposed wall disposed in substantially perpendicular relation to said heating elements, facing said channels, said vertical wall having at least one opening therethrough for collecting said vapor and means for separating droplets entrained in said vapor.

2. The apparatus according to claim 1, wherein said droplet separating means comprises a plurality of vertically extending elements in off-set, spaced apart relation to each other, each of said elements having a substantially U-shaped cross-section.

3. The apparatus of claim 1, wherein said droplet separating means comprises woven steel strips and a supporting framework for mounting said woven steel strips thereon.

4. The apparatus of claim 2, wherein said casing has a lower part and said vapor outlet is located in said lower part of said casing.

5. The apparatus of claim 4, wherein said U-shaped elements have a bottom part and two lateral walls extending therefrom, said walls having a vertical edge pointing toward said bottom part.

6. An apparatus for evaporating a liquid comprising:
   a casing;
   a plurality of vertically extending, plate-shaped heating elements within said casing, each of said heating elements having an outer surface and an inner surface and a vertical edge, said heating elements being disposed in spaced apart relation and forming an open channel along said vertical edge between adjacent elements;
   means, above said heating elements, for distributing said liquid over said elements;
   means, connected to said heating elements, for introducing a heating medium therein for contacting said inner surface and for generating vapor from said liquid;
   means, mounted within said casing, for collecting and guiding said vapor within said casing to a vapor outlet;
   said vapor collecting and guiding means comprising at least one vertical wall extending along and facing said channels and comprising openings therein for collecting said vapor;
   means for separating droplets entrained in said vapor;
   said droplet separating means comprising vertically elongated spaced elements having a substantially U-shaped cross-section; and
   said U-shaped elements having a bottom part and two lateral walls extending therefrom, said walls having a vertical edge pointing toward said bottom part.

* * * * *